Patented Nov. 10, 1953

2,658,889

UNITED STATES PATENT OFFICE 2,658,889

SUBSTITUTED PHENYLAZOMALONO-NITRILES

Moses Wolf Goldberg, Upper Montclair, and Albert Israel Rachlin, Maywood, N. J., assignors to Hoffmann-La Roche Inc., Nutley, N. J. a corporation of New Jersey No Drawing. Application August 22, 1950
Serial No. 180,888

7 Claims. (Cl. 260—193)

This invention relates to p-substituted phenylazomalononitriles, the p-substituent being a member of the group consisting of lower alkoxy, lower alkenoxy, and lower carboxylic acid acylamido radicals. The p-substituent may be, for example, methoxy, ethoxy, propoxy, allyloxy, acetamido, propionylamido, and the like.

The p-substituted phenylazomalononitriles can be prepared by reacting a p-substituted diazotised aniline with malononitrile. The p-substituent in the diazotized aniline is the same as hereinabove defined.

The new compounds are useful in the field of pharmaceuticals, and more particularly as anthelmintics.

The following examples will serve to illustrate the invention:

EXAMPLE 1

*p-Acetamidophenylazomalononitrile*

A solution of 43 grams of p-aminoacetanilide hydrochloride in 400 cc. of water containing 25 cc. of concentrated hydrochloric acid was diazotized with a solution of 19.7 grams of sodium nitrite in 100 cc. of water. Meanwhile, a solution of 82 grams of anhydrous sodium acetate in 200 cc. of water was chilled to 10° C. and added to the solution of the diazonium salt. A solution of 16.5 grams of malononitrile in 100 cc. of ethyl alcohol was added all at once, and the resulting slurry was stirred for one hour at 0 to 5° C. The product was filtered, washed with 500 cc. of water and dried at 110° C. Upon recrystallization from 2350 cc. of acetone and 1600 cc. of water, p-acetamidophenylazomalononitrile was obtained in the form of yellow needles, M. P. 221° C. with decomposition.

EXAMPLE 2

*p-Methoxyphenylazomalononitrile*

A solution of 30.8 grams of p-anisidine in 100 cc. of concentrated hydrochloric acid diluted with 200 cc. of water was diazotized with a solution of 19.7 grams of sodium nitrite in 200 cc. of water. Meanwhile, a solution of 82 grams of anhydrous sodium acetate in 200 cc. of water was chilled to 10° C. and added to the solution of the diazonium salt. A solution of 16.5 grams of malononitrile in 50 cc. of ethyl alcohol was added all at once, and the resulting slurry was stirred for one hour at 0 to 5° C. The product was filtered, washed with 500 cc. of water and dried in vacuo over phosphorus pentoxide. Upon recrystallization from a mixture of 840 cc. of ethyl alcohol and 560 cc. of water, p-methoxyphenylazomalononitrile was obtained in the form of orange crystals, M. P. 148° C. with decomposition.

EXAMPLE 3

*p-Allyloxyphenylazomalononitrile* p-Allyloxyaniline (123.5 grams) was dissolved in 140 cc. of concentrated hydrochloric acid diluted with 400 cc. of water. The solution was cooled to 0° C. and, with stirring, a solution of 57.2 grams of sodium nitrite in 400 cc. of water was added at such a rate that the temperature was maintained at 0 to 5° C. Meanwhile, 165 grams of anhydrous sodium acetate was dissolved in 400 cc. of water, the resulting solution cooled below 10° C. and then added to the diazo solution. Melted malononitrile (54.7 grams) was added slowly to the sodium acetate-diazo solution, the temperature being kept below 10° C. by the addition of ice as required. A yellow precipitate formed immediately and the cold slurry was stirred for one hour. The product was gathered on a Buchner funnel, washed three times with 250 cc. of water, and air dried. The crude material was dissolved in a hot mixture of 830 cc. of glacial acetic acid and 650 cc. of water. The solution was allowed to cool, first at room temperature, and then to 4° C. to insure complete crystallization. The brown crystals thus obtained were filtered, washed with a 1:1 mixture of acetic acid and water and dried in vacuo over solid potassium hydroxide at room temperature. The p-allyloxyphenylazomalononitrile thus obtained melted at 128° C.

The p-substituted phenylazomalononitriles described above, can also be regarded as p-substituted phenylhydrazones of oxomalononitrile, the p-substituent being the same as defined hereinabove. It will be understood that the "phenylazo" designation of the new compounds also embraces the tautomeric "phenylhydrazone" forms, both in the description and in the claims. The relationship of the tautomeric forms can be illustrated by the following formulae:

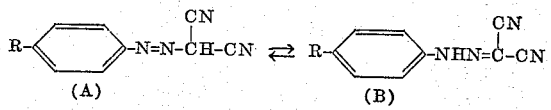

wherein R stands for lower alkoxy, lower alkenoxy, and lower carboxylic acid acylamido. Formula A represents the "phenylazo" form of the compounds and Formula B, the tautomeric "phenylhydrazone" form.

We claim:
1. A p-substituted phenylazomalononitrile wherein the p-substituent is selected from the group consisting of lower alkoxy, lower alkenoxy and lower carboxylic acid acylamido radicals.
2. A p-lower alkoxy-phenylazomalononitrile.
3. A p-lower alkenoxy-phenylazomalononitrile.
4. A p-lower carboxylic acid acylamido-phenylazomalononitrile.
5. p-Methoxyphenylazomalononitrile.
6. p-Allyloxyphenylazomalononitrile.
7. p-Acetamidophenylazomalononitrile.

MOSES WOLF GOLDBERG.
ALBERT ISRAEL RACHLIN.

References Cited in the file of this patent

UNITED STATES PATENTS

| Number | Name | Date |
|---|---|---|
| 2,211,339 | McNally et al. | Aug. 13, 1940 |
| 2,392,167 | Long | Jan. 1, 1946 |
| 2,396,917 | Hanford et al. | Mar. 19, 1946 |
| 2,415,381 | Woodward | Feb. 4, 1947 |
| 2,552,355 | Von Glahn | May 8, 1951 |

OTHER REFERENCES

Hardwood et al., Journal American Vet. Medical Association, September 1940. Pages 248–250.